United States Patent [19]

Gerber et al.

[11] 4,426,783
[45] Jan. 24, 1984

[54] MARKING INSTRUMENT ACTUATOR FOR PLOTTING APPARATUS OR THE LIKE

[75] Inventors: Heinz J. Gerber; Yuval Mishli, both of West Hartford; Vincent J. Carulli, Ellington; Joseph H. Cohen, West Hartford, all of Conn.

[73] Assignee: Gerber Garment Technology, Inc., South Windsor, Conn.

[21] Appl. No.: 303,639

[22] Filed: Sep. 18, 1981

[51] Int. Cl.³ .............................................. G01D 15/24
[52] U.S. Cl. ..................................... 33/1 M; 33/18 R; 33/32 R; 346/139 C
[58] Field of Search ................... 33/1 M, 18 R, 32 D, 33/32 E, 32 R; 346/136, 140 R, 139 C, 140 A, 29; 226/162, 161, 8, 120

[56] References Cited

U.S. PATENT DOCUMENTS

| | | | |
|---|---|---|---|
| 1,438,829 | 12/1922 | Howell | 346/139 C |
| 3,016,612 | 1/1962 | Lynott | 346/139 |
| 3,169,821 | 2/1965 | Miller | 346/140 |
| 3,199,447 | 8/1965 | Jaffa et al. | 226/120 X |
| 3,209,365 | 9/1965 | Fasola, Jr. | 346/140 A |
| 3,844,461 | 10/1974 | Robison et al. | 33/1 M |
| 4,091,980 | 5/1978 | Gerber | 226/162 |
| 4,346,392 | 8/1982 | Isobe et al. | 346/139 C |

Primary Examiner—William D. Martin, Jr.
Attorney, Agent, or Firm—McCormick, Paulding & Huber

[57] ABSTRACT

An automated plotting apparatus has a carriage assembly for positioning an axially elongated pen relative to a plotting sheet supported on a plotting surface in response to command signals received from a controller. A solenoid assembly coaxially surrounds an associated portion of the pen and moves it axially into marking engagement with the sheet. Marking fluid is supplied to the pen from a pressurized reservoir. Pinions driven by a motor mounted in stationary position relative to the plotting surface engage racks mounted on the carriage assembly to move the carriage assembly relative to the plotting surface.

12 Claims, 7 Drawing Figures

MARKING INSTRUMENT ACTUATOR FOR PLOTTING APPARATUS OR THE LIKE

BACKGROUND OF THE INVENTION

This invention relates in general to apparatus for working on sheet material and deals more particularly with improvements in automated apparatus for plotting on or otherwise marking sheet material. An apparatus of the type with which the present invention is concerned includes a carriage assembly which moves a marking instrument or pen relative to a sheet of material or plotting paper spread upon a supporting surface in response to command signals received from a controller.

In a plotting apparatus of the aforedescribed general type it is generally desirable that the pen be arranged for rapid movement into and out of marking engagement with the plotting paper. At the begining and end of each plotted line it is usually necessary to momentarily halt the instrument carriage, which supports the gas, while the pen is moved into or out of marking engagement with the paper. Consequently, it is desirable to minimize the distance through which the pen moves between positions of marking engagement and disengagement with the plotting paper to enable rapid response. Heretofore, mechanically actuated linkages have generally been utilized for moving the marking instrument into and out of marking engagement with the plotting sheet. Since such mechanical systems are prone to vibrational movement, substantial clearance must be maintained between the plotting surface and the marking instrument when the instrument is out of marking engagement with the plotting sheet to prevent accidental marking due to vibrational movement of the plotting instrument and to compensate for irregularities in the plotting surface. Also, response time is increased by acceleration and deceleration of connecting linkages actuating the pen or marking instrument. Further, the carriage assembly which moves the instrument is subjected to frequent acceleration and deceleration during the normal plotting operation. The aforementioned conditions tend to increase apparatus response time and thereby reduce plotting speed. The present invention is primarily concerned with the aforementioned problems.

SUMMARY OF THE INVENTION

The invention relates to improvements in a plotting apparatus which includes a work surface for supporting a sheet of plotting material and a carriage assembly for positioning a plotting head relative to the work surface. In accordance with the invention, the plotting head includes an improved actuating means which coaxially surrounds an associated portion of an axially elongated plotting member for moving the plotting member in an axial direction and into marking engagement with the plotting material. A drive means for moving the carriage assembly relative to the work surface comprises a pair of parallel racks mounted on the carriage assembly for movement with it and relative to the work surface. A drive motor mounted in fixed position relative to the work surface, and a pair of pinions driven by the drive motor. Each of the pinions meshingly engages an associated one of the racks to move the carriage relative to the work surface.

DETAILED DESCRIPTION OF PREFERRED EMBODIMENT

Figure 1:
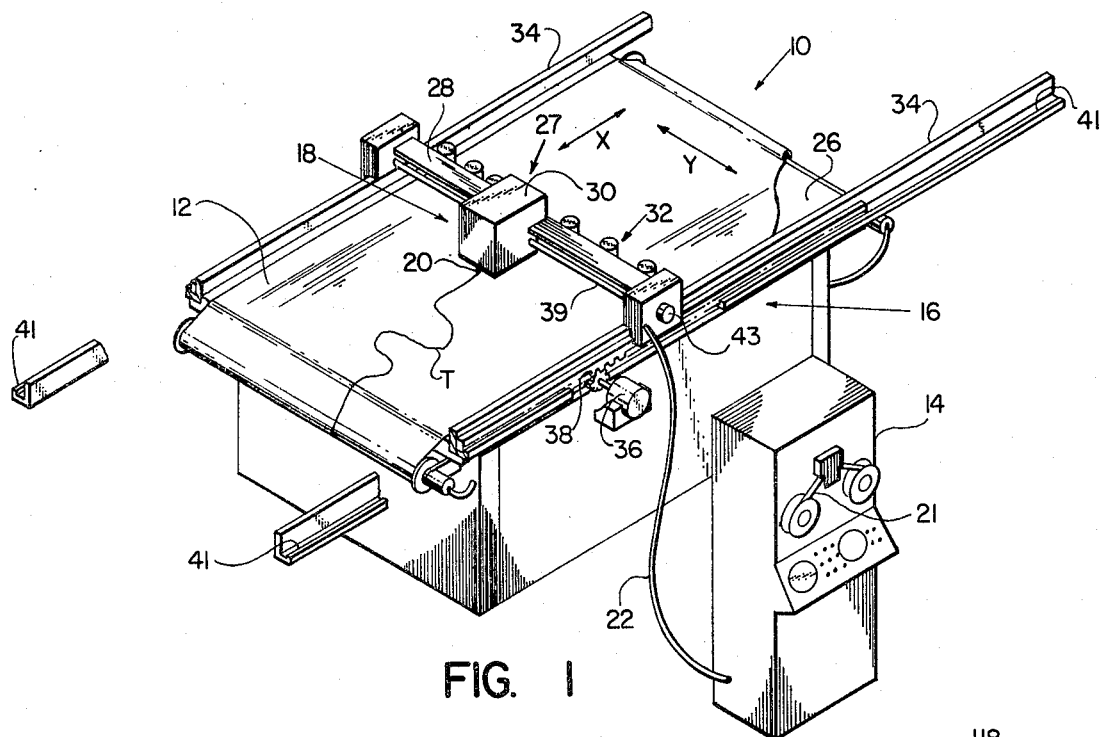
FIG. 1 is a perspective view of an automatically controlled plotter embodying the present invention.

The present invention may be practiced with any automatically controlled system which includes a marking instrument supported by a carriage for precise positioning over a strip of sheet material held firmly in fixed position on a stationary work surface while the instrument operates on the sheet material. The invention is hereinafter illustrated and described with particular reference to a numerically controlled plotting machine, indicated generally at 10, which produces graphical information on a strip of sheet material or plotting paper 12. The plotting machine 10 generally comprises a controller 14, which generates plotting commands, a flat bed plotting table, indicated generally at 16, and a plotting head assembly, designated generally by the numeral 18. The plotting head assembly includes an axially elongated marking instrument or pen 20 responsive to the plotting commands, received from the controller 14, for marking graphic information on the plotting paper 12. The controller 14 reads a plotting program from a punched or magnetic tape 21 and converts the program into motor command signals which are transmitted to the plotting table through a control cable 22.

The plotting table 16 further includes a bed, indicated generally at 24, which is preferably made from 60 durometer rubber coated with a film of MYLAR plastic to provide a low friction plotting surface 26. A carriage assembly, indicated generally at 27, is supported on the table 16 and includes an X-carriage 28, supported for reciprocal movement in the illustrated X-direction relative at the plotting surface 26, and a Y-carriage 30, mounted on the X-carriage and movable relative to it and to the plotting surface in the illustrated Y-direction. Composite motions of the carriages 28 and 30 permit the plotting pen 20 to be translated to any coordinate position relative to the stationary plotting surface 26 on which the plotting paper 12 is supported. The plotting machine 10 is particularly adapted to generate a continuous plot or trace T on an elongated strip of paper or other sheet material which is considerably longer than the table 16 which supports it, as shown in FIG. 1. Since the machine 10 is capable of operating on only a limited section of the plotting paper 12, a mechanism, indicated generally at 32 in FIG. 1, is provided for coupling the plotting paper to the carriage assembly 27 to intermittently advance the plotting paper over the plotting surface 26 so that the plotting pen may operate on successive sections of the paper strip 12 to generate a continuous trace T. Such coupling mechanism is known in the art and, therefore, details of the coupling mechanism are not shown. Further disclosure of such a coupling mechnism is found in U.S. Pat. No. 4,091,980, issued to Heinz Joseph Gerber for APPARATUS FOR ADVANCING SHEET MATERIAL. The aforesaid U.S. patent and the references cited therein are hereby adopted by reference as part of the present disclosure.

The X-carriage 28 is guided for accurate movement in the X-direction by ways 34, 34 which extend longitudinally along opposite side edges of the plotting table. An X-carriage drive motor 36 mounted in fixed position on the table 16 drives pinions 37, 37 mounted at opposite ends of a shaft 39 which extends transversely of the table 16 below the plotting surface 26. The pinions 37, 37 engage racks 38, 38 mounted on the X-carriage 28 at opposite sides of the table. The racks move with the X-carriage and relative to the table 16 to accurately translate the carriage to various positions relative to the work surface 26. Preferably, the racks 38, 38 are made from lightweight plastic material. Each rack 38 is supported for sliding movement longitudinally of the table 16 within associated channels 41, 41 mounted in fixed position on the table adjacent an associated side thereof.

The Y-carriage 30 is supported on a bridging portion of the X-carriage to move transversely of the table 16 in the Y-direction. The illustrated plotting machine 10 has a Y-carriage drive motor 43 which rotates a lead screw 39 in response to command signals received from the controller 14. The lead screw extends in the Y-direction and is threadably engaged with the Y-carriage 30 to accurately position it along the X-carriage 28 and in the Y-direction.

Figure 2:
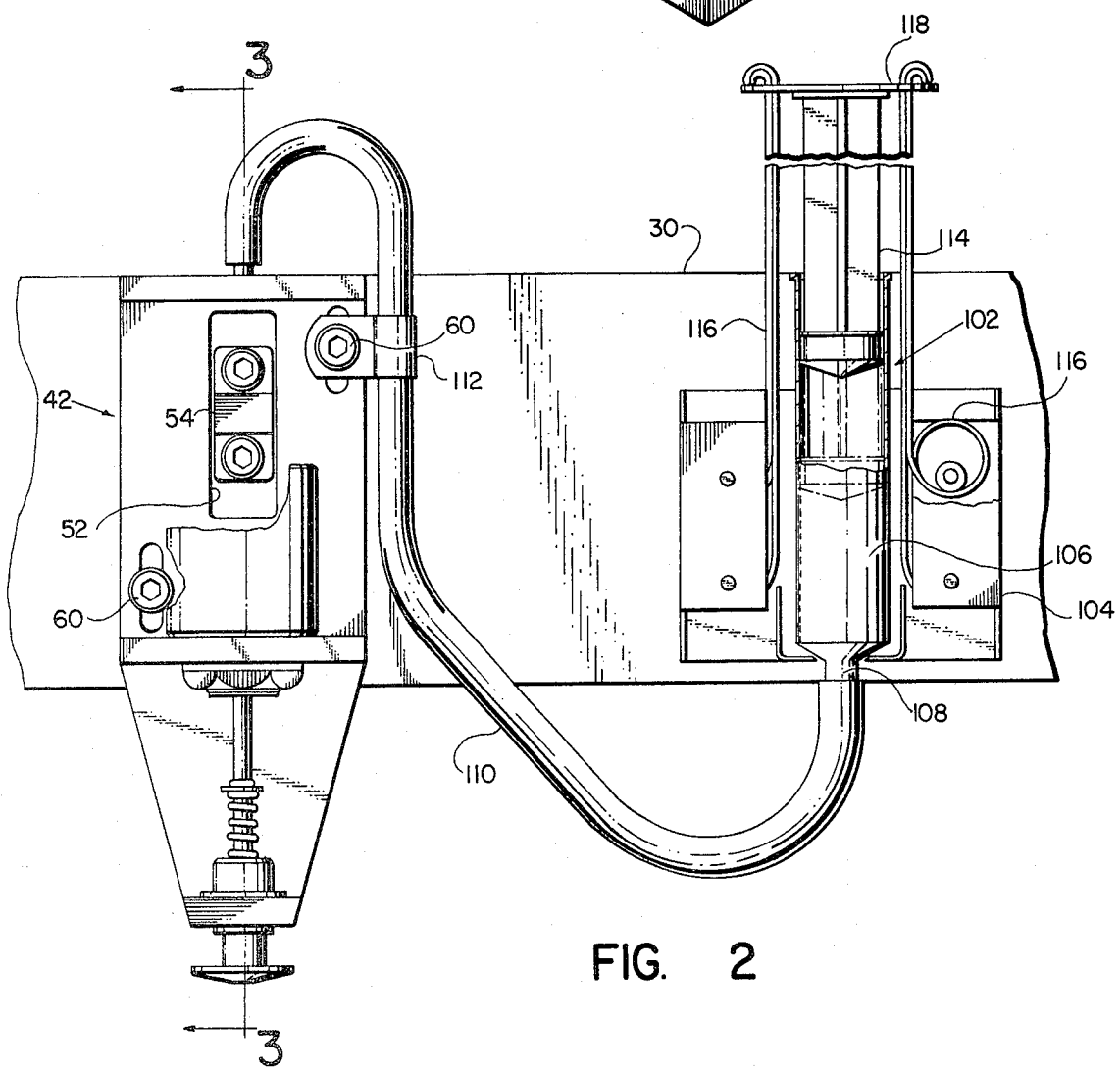
FIG. 2 is a somewhat enlarged fragmentary front elevational view of the plotting instrument assembly of FIG. 1.
Figure 3:
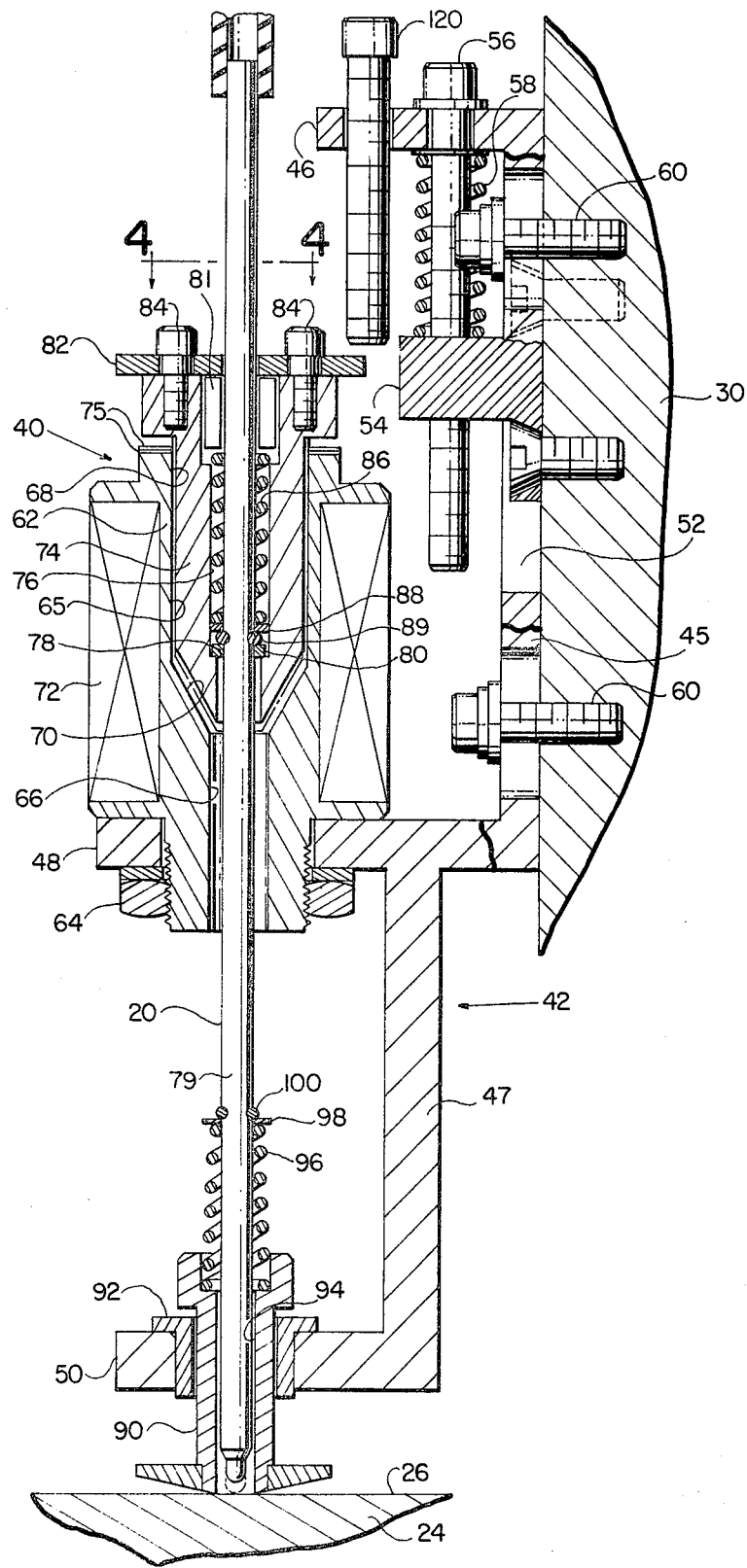
FIG. 3 is a somewhat further enlarged fragmentary sectional view taken along the line 3—3 of FIG. 2.
Figure 5:
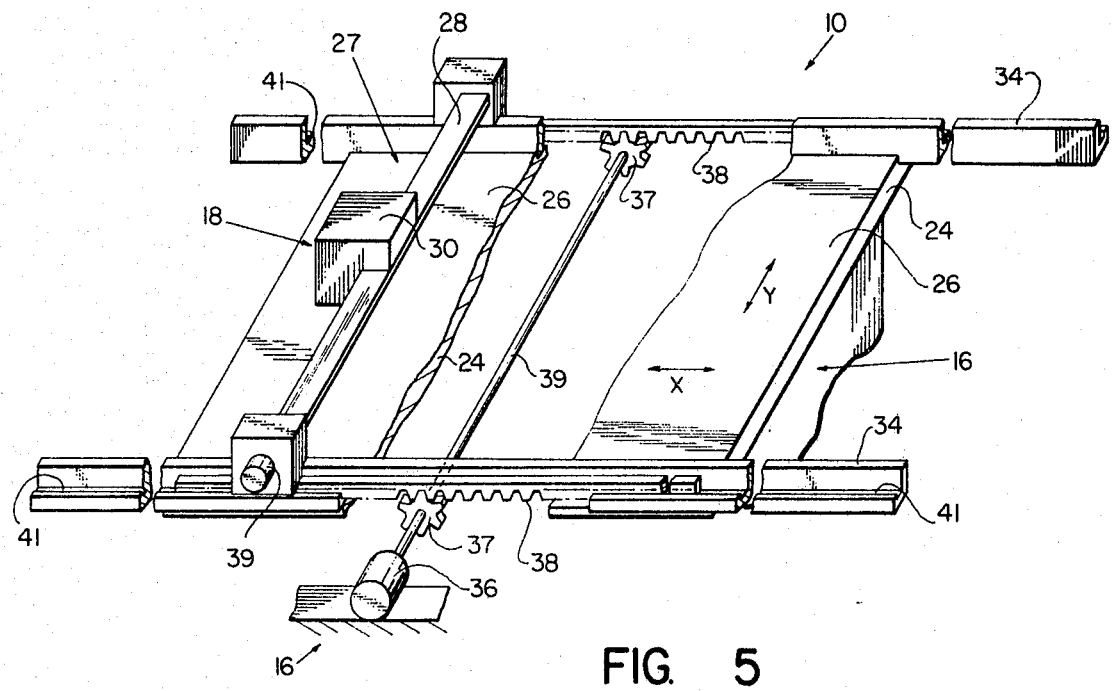
FIG. 5 is a somewhat schematic perspective view of a portion of the plotting apparatus shown in FIG. 1.
Figure 4:
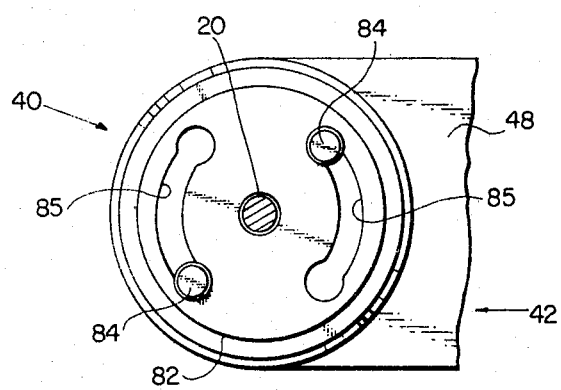
FIG. 4 is a fragmentary sectional view taken along line 4—4 of FIG. 3.

Considering now the plotting head assembly in further detail and referring particularly to FIGS. 2-4, the illustrated head assembly 18 essentially comprises an actuating device or a solenoid assembly of a conventional type, indicated generally at 40, which coaxially surrounds an associated portion of the axially elongated pen 20 and which operates to move the pen into and out of marking engagement with a sheet of material, such as the plotting paper 12, spread in the plotting surface 26. The solenoid assembly 40 is carried by a mounting bracket, indicated generally at 42, which is secured to the Y-carriage 30 for limited vertical adjustment generally toward and away from the plotting surface 26. The bracket 42 has a generally vertically oriented rear wall 45. Upper and intermediate shelf portions, respectively indicated at 46 and 48, project forwardly from the rear wall 45. Another wall 47 depends from the intermediate shelf 48 and carries a lower shelf 50 which projects forwardly from it. The rear wall 45 has a vertically extending slot 52 formed in it, as best shown in FIG. 2. An adjustment nut 54 fastened in fixed position to the Y-carriage 30 projects forwardly through the slot 52 and is threadably engaged by a vertically oriented adjustment screw 56 which passes through the upper shelf 46. A compression spring 58 received on the adjustment screw 56 acts between the adjustment nut 54 and the upper shelf 46 to assert an upwardly directed biasing force upon the mounting bracket 42 so that rotation of the adjustment screw 56 in either direction effects vertical movement of the bracket 42 relative to the plotting surface 26. Additional fasteners 60, 60 extend through associated vertical slots in the rear wall 45, as shown in FIG. 2, to releasably secure the bracket 42 in a selected position of vertical adjustment relative to the plotting surface and the Y-carriage upon which the bracket is mounted.

The solenoid assembly 40 has a hollow core 62 which is externally threaded at its lower end. A retaining nut 64 cooperates with an annular glange on the lower end portion of the core to secure the solenoid assembly 40 to the intermediate shelf 48. A generally cylindrical and axially vertical bore 65 extends through the hollow core 62 and has a lower end portion 66, a diametrically enlarged upper end portion 68, and a generally conical upwardly diverging transitional portion 70 intermediate the lower and upper end portions of the bore. A solenoid coil 72 coaxially surrounds the core 62, as schematically indicated in FIG. 2.

The solenoid assembly further includes an armature, indicated at 74, which is generally cylindrical and has a diametrically enlarged annular flange at its upper end. The armature is slidably received within the bore upper end portion 68 and has a frustoconical lower end portion which substantially complements the bore transitional portion 70. A generally cylindrical stepped bore 76 extends coaxially through the armature 74 and has an axially upwardly facing annular shoulder 78 near its lower end. One or more plastic annular washers 75 encircle the armature immediately above the core 62 to prevent the armature from sticking to the core and to silence operation of the solenoid assembly 40.

The illustrated pen 20 has a ball-point and an axially elongated tubular body 79 which defines a reservoir for containing a quantity of marking fluid or ink, and may, for example, comprise a modified ball-point pen cartridge of conventional type. The pen 20 extends coaxially through the armature bore 76 and the bore lower end portion 66. A shaft spacer 80 received within the armature bore 76 is seated on the annular shoulder 78 and surrounds an associated portion of the pen body 79. A TEFLON bearing 81 received within a diametrically enlarged upper end portion of the armature bore 76 surrounds another portion of the pen body 79 and is retained in assembly with the armature 74 by a locking knob 82 releasably secured to the annular flange at the upper end of the armature by a pair of cap screws 84, 84. The latter cap screws extend through arcuate slots 85, 85 in the locking knob 82, as shown in FIG. 4. End portions of these arcuate slots are enlarged to permit the heads of the cap screws 84, 84 to pass therethrough. Thus, the locking knob may be rotated and removed from the armature 74 when the screws 84, 84 are loosened and without removing the screws from the armature.

The pen 20 is operably connected to the armature 74 by a first resilient member or compression spring 86 which coaxially surrounds an associated portion of the pen body 79 within the armature bore 76. The spring 86 acts between the lower end of the TEFLON bearing 81 and a shaft spacer 88 received on the pen body and secured by a retaining ring 89 engaged within an annular groove in the pen body above and adjacent the shaft spacer 80.

The lower end portion of the pen body 79 is supported by a presser foot 90 slidably received in a guide bushing 92 carried by the lower shelf 50. The presser foot is generally cylindrical and has a diametrically enlarged annular flange at its upper end disposed above the guide bushing 92. A stepped bore 94 extends coaxially through the presser foot 90 and receives the lower end portion of the pen 20. A second resilient member or compression spring 96 received on the pen body 79 acts between the upper end of the presser foot 90 and a shaft spacer 98 which is received on the pen body and secured thereto about the presser foot by a retaining ring 100 engaged within an associated annular groove in the pen body.

As previously noted, the pen 18 may comprise a modified ball-point pen cartridge containing a supply of marking fluid or ink, however, the illustrated pen 20 has a separate ink supply system which includes pressurized ink reservoir assembly, indicated generally at 102, containing a somewhat larger supply of ink than could be contained within the pen itself. The ink reservoir assembly 102, shown in FIG. 2, is supported by a bracket 104 mounted in fixed position on the Y-carriage 30 and comprises an upwardly opening cylindrical body 106 which has an ink outlet at its lower end terminating at the tube fitting 108. A flexible tube 110 received on the tube fitting 108 is attached to the upper end of the tubular pen 20 to supply ink to it. A tubing clamp 112 secures the tube to the mounting bracket 42 and prevents movement of the tube 110 between the clamp and the reservoir body 106. A plunger 114 received in the reservoir body 106 bears against the surface of the ink within it to maintain the ink within the supply system under pressure. The ink supply within the system is maintained at uniform pressure by negator springs 116, 116 which act between the mounting bracket 104 and a cap 118 which overlies the upper end of the plunger 114. The springs 116, 116 comprise flat, sprially wound springs which constantly apply substantially uniform downward pressure to the plunger 114 throughout the entire length of its stroke, so that constant, uniform ink delivery pressure is maintained at the pen 20.

The pen 20 and the solenoid armature 74, resiliently connected to it by the spring 86, are upwardly biased relative to the pressure foot 90 by the spring 96. Clearance between the lower surface of the presser foot 90 and the marking end or tip of the pen, in its raised position, is determined by the length of the presser foot 90 and the spring 96 (uncompressed). A constant clearance from the tip of the pen to the plotting surface is approximately 0.040 inches or 0.101 centimeters. This clearance remains constant throughout the operation of the pen, provided that the solenoid is not activated; the clearance does not need to be adjusted.

Preparatory to operating the plotting apparatus 10 the lowest point on the plotting surface relative to the path of the movable carriage assembly is determined. The pen is then positioned relative to the plotting surface in coaxial alignment with this lowest point after which the fasteners 60, 60 are loosened. The mounting bracket 42 is vertically adjusted by turning the adjustment screw 56 in one or the opposite direction to raise or lower the mounting bracket 42. At the lowest point on the plotting surface the gap (stroke) between the solenoid body 72 and the solenoid armature 74 must be minimized to 0.060 inches, because the solenoid weakens non-linearally as the stroke increases. Differences in the length of the stroke are due to irregularities in the surface of the plotting table. These differences are transferred to the solenoid armature 74 by the presser foot 90, which carries the pen 20 as it passes across the paper.

Figure 6:
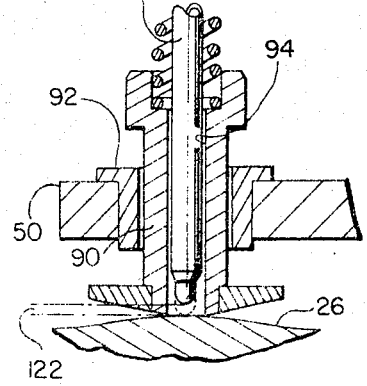
FIG. 6 is a diagrammatic illustration of the position of the pen and presser foot at the highest point on the plotting surface.
Figure 7:
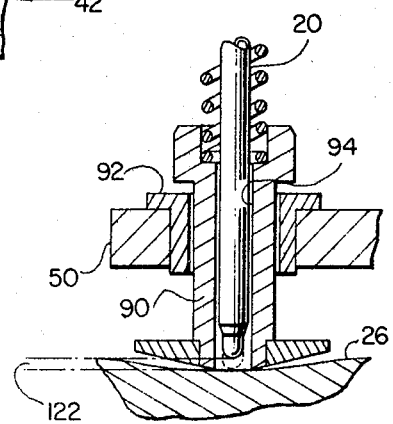
FIG. 7 is similar to FIG. 6 but illustrates the position of the pen and presser foot at the lowest point on the ploting surface.

The diagramatic views of FIGS. 6 and 7 illustrate, respectively, the position of the pen 20 at the highest and lowest points on the plotting surface 26, when the solenoid is not activated. It should be noted that the clearance between the tip of the pen 20 and the plotting surface 26 remains constant. This clearance is indicated by the numeral 122. Thus, the presser foot 90, acting through the pen 20 causes the armature 74 to move in response to irregularities in the plotting surface. An adjustment screw 120 is positioned to allow the solenoid armature 74 to barely touch the adjustment screw at the highest point on the table. The plotting apparatus 10 is now ready for operation in response to command signals from the controller 14.

As the carriage assembly moves relative to the plotting surface 26 with the pen 20 out of plotting engagement with a sheet of plotting paper 12 spread upon the plotting surface 26, the presser foot 90 will, at all time be in engagement with the plotting paper and the tip of the pen retracted within the presser foot. Energization of the solenoid assembly 40 moves the pen downwardly into marking engagement with the plotting paper in opposition to the biasing force of the spring 96. The spring 86 within the solenoid armature allows for vertical movement of the pen relative to the armature 74 when the solenoid assembly 40 is energized. This arrangement compensates for slight irregularities in the plotting surface as the pen moves relative to the plotting surface and also serves to maintain substantially constant pen pressure on the plotting paper. Because the pen is integrally attached to the solenoid armature, the solenoid activates its own mass only, thereby permitting rapid responsive movement of the pen into and out of marking engagement with the plotting paper.

The use of relatively lightweight racks carried by the X-carriage and moved by a drive motor and associated wiring mounted in fixed position on the table 16 minimizes the weight of the carriage assembly and thereby minimizes carriage assembly inertia to enable rapid carriage assembly response to command signals received from the controller 14.

When it becomes necessary to service or replace the pen 20, the cap screws 84, 84 are loosened and the locking knob is rotated and removed from assembly with the solenoid armature 74. The pen may then be removed from assembly with the armature and repaired or replaced, as necessary.

We claim:

1. In a plotting apparatus or the like having means defining a plotting surface for supporting a sheet of plotting material, a carriage assembly, means supporting the carriage assembly for movement relative to the plotting surface, a plotting head assembly supported on the carriage assembly and including an axially elongated marking instrument having a marking end and actuating means coaxially surrounding an associated portion of the marking instrument for moving the instrument into marking engagement with plotting material supported on the plotting surface, and drive means for moving the carriage assembly relative to the plotting surface to move the marking instrument relative to the plotting material, the improvement comprising first resilient means for connecting said marking instrument to said actuating means, presser foot means for engagement with the plotting material supported on said plotting surface, and second resilient means acting between said presser foot means and said marking instrument for normally maintaining a constant clearance distance between said marking end and said plotting surface when said marking instrument is out of marking engagement with the plotting material.

2. In a plotting apparatus as set forth in claim 1 the further improvement wherein said second resilient means comprises a spring.

3. In a plotting apparatus as set forth in claim 1 the further improvement wherein said first resilient means comprises a spring.

4. In a plotting apparatus as set forth in any one of claims 1, 2 or 3 the further improvement wherein said actuating means comprises electromagnetic means.

5. In a plotting apparatus as set forth in claim 4 the further improvement wheren said electromagnetic means comprises a solenoid having an armature and said marking instrument is connected to said armature.

6. In a plotting apparatus as set forth in claim 4 the further improvement wherein said plotting member comprises a tubular pen.

7. In a plotting apparatus as set forth in claim 6 the further improvement wherein said pen comprises a ball-point pen cartridge.

8. In a plotting apparatus as set forth in claim 6 the further improvement wherein said apparatus includes a supply reservoir remote from said pen for containing a quantity of marking fluid and means for delivering marking fluid from said supply reservoir to said pen.

9. In a plotting apparatus as set forth in claim 8 the further improvement comprising pressure means for constantly applying substantially uniform pressure to making fluid within said supply reservoir.

10. In a plotting apparatus as set forth in claim 9 the further improvement wherein said supply reservoir comprises a cylindrical container and said pressure means comprises a plunger received within said container.

11. In a plotting apparatus as set forth in claim 10 the further improvement wherein said pressure means comprises spring means for applying substantially uniform biasing force to said plunger throughout the length of its stroke.

12. In a plotting apparatus as set forth in any one of claims 1, 3 or 2, the further improvement comprising means for releasably securing said marking instrument in connected relation to said actuating means.

* * * * *